April 20, 1937. W. J. SIX 2,078,033
PISTON EXPANDER
Filed Oct. 10, 1932
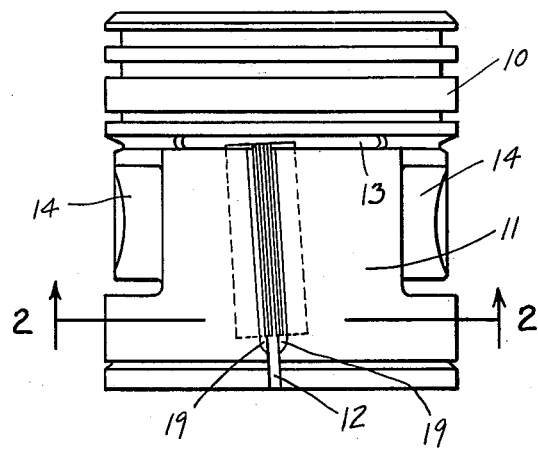
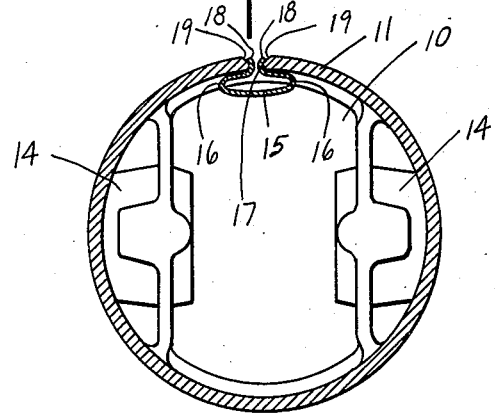
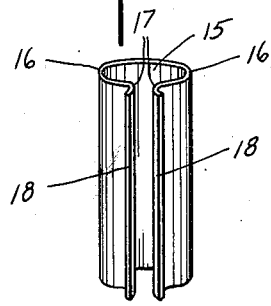
INVENTOR.
WALTER J. SIX.
BY
Lockwood Lockwood Goldsmith & Galt
ATTORNEYS.

Patented Apr. 20, 1937

2,078,033

UNITED STATES PATENT OFFICE 2,078,033

PISTON EXPANDER

Walter J. Six, Indianapolis, Ind.

Application October 10, 1932, Serial No. 637,033

2 Claims. (Cl. 309—12)

This invention relates to expanding means for skirts of pistons adapted for use in engines, such as internal combustion engines, compression engines, steam engines and the like.

It is usual to provide such pistons with a head and a skirt which is partially or wholly separated from the head by a circumferential opening or openings. The lands between the ring grooves on the head are usually made slightly smaller in diameter than the diameter of the skirt which is formed initially to closely fit the interior of the cylinder. The skirt, particularly when formed of aluminum or similar metal, is usually slotted longitudinally to permit the skirt to expand and contract so that it will closely follow the cylinder wall. However, due to wear of the cylinder and the piston this closeness of fit between the skirt and the cylinder wall is soon destroyed with the attendant results of "piston slap", undue leakage of the oil past the piston rings, and decreased efficiency of the engine. In order to overcome these defects without reboring the cylinders or replacing the pistons, it has been heretofore suggested that spring means of some sort within the skirt be provided to expand the skirt.

The principal object of my invention is to provide an improved and simple expander which exerts an expansive action substantially about the entire skirt while permitting the skirt to contract when necessary in operation, and thereby attain a more perfect fit between the worn skirt and the cylinder wall than has been possible heretofore.

The invention resides in a leaf spring expander adapted to be compressed within a worn piston to exert an expansive pressure upon the skirt. More particularly, it relates to a simplified form of expander adapted to be inserted within the skirt of the piston to engage the adjacent edges thereof formed by the substantially longitudinal slot or split, whereby the split will be spread for expanding the skirt. For this purpose, an expander is formed to extend substantially the length of the skirt, said expander being provided with flanges adapted to engage the edge of the slot for securing the expander in place and spreading the slot for expanding the skirt. The form of the expander is such as to permit contraction, while normally exerting an outward expanding force under inherent spring tension against the adjacent edges of the slotted portion of the skirt, and particularly midway between the wrist pin bosses.

The full nature of the invention will be understood from the accompanying drawing and the following description and claims.

Fig. 1 is a side elevation of a piston with the expander mounted therein. Fig. 2 is a section taken on the line 2—2 thereof. Fig. 3 is a perspective view of the expander before installation.

In the drawing there is shown a piston having a piston head 10, a skirt 11 provided with a substantially longitudinal slot or split 12 formed therein and extending from the lower free end of the skirt to the peripheral slot 13 which partially separates the skirt from the head. Formed in said skirt are the usual piston ring bosses 14.

The expander as illustrated in Fig. 3 comprises a tube-like member substantially oval in cross section having the body portion 15, side folds 16, inner reverse folds 17, and outwardly turned flanges 18, said folds and flanges extending parallel with each other throughout the length of the expander. Said expander is adapted to be inserted in the skirt of a piston to extend from adjacent the lower open end thereof to the peripheral slot 13. The flanges 18 of the expander are formed to engage and interlock with the opposed edges of the skirt formed by the slot 12, which edges may be slightly bevelled as indicated at 19 to better receive and interlock with the flanges 18. The body portion and folds of the expander lie within the piston skirt, the folds 17 engaging therewith, together with the flanges 18, while the outer folds 16 are adapted to produce an expansive force while permitting of contraction under pressure.

Said expander is inserted in the piston skirt and interlocked with the split edges thereof under tension so as to normally exert an expansive force for spreading the slot and thereby causing expansion or enlargement of the peripheral length of said skirt.

The invention claimed is:

1. In combination with a piston having a head, oppositely disposed wrist pin bosses secured thereto, and a skirt depending therefrom having a substantially longitudinal slot located on one side intermediate said bosses, of a removable leaf spring expander sprung into position within said skirt under spring tension, said expander being mounted adjacent said slot and substantially midway between said bosses, the body portion thereof being slightly spaced inwardly free from the piston skirt and provided with opposite expansion folds running longitudinally thereof, which folds terminate in inner reverse folds spaced from each other, said reverse folds engaging and interlocking with the free edge of the slot for causing the expansion folds to normally exert an outward pressure for spreading the slot and expanding the skirt substantially midway between the bosses while yieldingly permitting contraction thereof.

2. In combination, a piston skirt provided with a substantially longitudinal slot, and a removable leaf spring expander engaging the skirt, said expander comprising a body portion of curvilinear cross-section and normally spaced flanges having free edges extending outwardly from said body portion, the said expander being compressed and sprung into position whereby said body portion lies inside said skirt in close proximity to said slot and said flanges frictionally engage the edges of the skirt defining said slot to exert an expansive force on said skirt while permitting contraction thereof.

WALTER J. SIX.